US012572425B2

(12) United States Patent (10) Patent No.: US 12,572,425 B2
Gottipati et al. (45) Date of Patent: Mar. 10, 2026

(54) SYSTEM AND METHOD FOR SCANNING FILE SYSTEMS

(71) Applicant: DRUVA INC., Sunnyvale, CA (US)

(72) Inventors: Srikiran Gottipati, Andra Pradesh (IN); Milind Vithal Borate, Maharashtra (IN); Nishith Chitaliya, Maharashtra (IN)

(73) Assignee: Druva Inc., Santa Clara, CA (US)

( * ) Notice: Subject to any disclaimer, the term of this patent is extended or adjusted under 35 U.S.C. 154(b) by 0 days.

(21) Appl. No.: 18/514,193

(22) Filed: Nov. 20, 2023

(65) Prior Publication Data

US 2024/0168851 A1 May 23, 2024

(51) Int. Cl.
G06F 11/14 (2006.01)
G06F 9/50 (2006.01)
G06F 11/1446 (2026.01)

(52) U.S. Cl.
CPC ........ G06F 11/1441 (2013.01); G06F 9/5083 (2013.01); G06F 11/1461 (2013.01)

(58) Field of Classification Search
CPC .............. G06F 11/1441; G06F 9/5083; G06F 11/1461; G06F 2201/84; G06F 11/1466; G06F 9/5066; G06F 2209/5011; G06F 2209/5017

USPC ........................................................ 714/6.3
See application file for complete search history.

(56) References Cited

U.S. PATENT DOCUMENTS

| | | | | | |
|---|---|---|---|---|---|
| 6,067,541 | A | * | 5/2000 | Raju ...................... | G06F 16/10 |
| 6,442,663 | B1 | * | 8/2002 | Sun .......................... | G06F 9/54 |
| | | | | | 711/202 |

OTHER PUBLICATIONS

Wikipedia "application checkpointing" page, retrieved from https://en.wikipedia.org/wiki/Application_checkpointing (Year: 2025).*

* cited by examiner

*Primary Examiner* — Yair Leibovich
(74) *Attorney, Agent, or Firm* — IceMiller LLP

(57) ABSTRACT

A system for scanning a file system is presented. The system includes a memory storing one or more processor-executable routines; and a processor communicatively coupled to the memory. The processor is configured to execute the one or more processor-executable routines to execute a file system scan using a depth-first concurrent scan method; create one or more checkpoints during the file system scan based on one or more predefined time intervals; and restart a scan from a latest checkpoint of the plurality of checkpoints. A related method is also presented.

18 Claims, 15 Drawing Sheets

SYSTEM AND METHOD FOR SCANNING FILE SYSTEMS

CROSS REFERENCE TO RELATED APPLICATION

This application claims a benefit of, and priority to, India Provisional Patent Application No. 202241067462, filed Nov. 23, 2022, the contents of which is incorporated by reference in its entirety.

BACKGROUND

Embodiments of the present invention generally relate to systems and methods for scanning file systems, and more particularly to systems and methods for restarting a file scan based on one or more checkpoints created using a depth-first concurrent scan method.

Typically, to perform a backup or a restore of a filesystem, the entire filesystem hierarchy needs to be scanned that involves listing all directories and reading all files. Although some storage solutions support filesystems with change tracking features that help reduce time and resources required for incremental scans, a full backup or a restore of a filesystem with the change tracking features still requires the scanning of the entire filesystem hierarchy. Scan of a large filesystem puts heavy load on the storage server that is serving the filesystem as well as take up significant processing and network resources when backing up to remote storages like the cloud. This could result in a crash or calls for terminating an active scan to alleviate load on either the storage server or the network that would be required for other priority jobs. Thereby, requiring a full scan of the file hierarchy from the start.

Thus, there is a need for systems and methods that provide for restarting a file scan in the event of a crash or a controlled termination of a scan to alleviate load on the resources consumed by the scan.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a system for scanning a file system is presented. The system includes a memory storing one or more processor-executable routines; and a processor communicatively coupled to the memory. The processor is configured to execute the one or more processor-executable routines to execute a file system scan using a depth-first concurrent scan method; create one or more checkpoints during the file system scan based on one or more predefined time intervals; and restart a scan from a latest checkpoint of the plurality of checkpoints.

According to another example embodiment, a method for scanning a file system is presented. The method includes executing a file system scan using a depth-first concurrent scan method; creating one or more checkpoints during the file system scan based on one or more predefined time intervals; and restarting a scan from a latest checkpoint of the plurality of checkpoints.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein:

FIG. 3I illustrates an example scenario for a restart method, according to some aspects of the present description;

DETAILED DESCRIPTION OF EXAMPLE EMBODIMENTS

Figure 1:
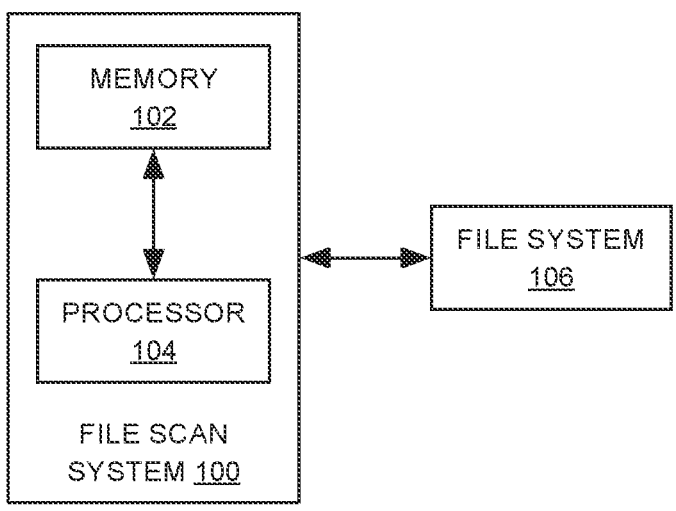
FIG. 1 illustrates an example file scan system, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently, or simultaneously. In addition, the order of operations may be re-arranged. The processes may be terminated when their operations are completed but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide systems and methods for scanning a file system. Example embodiments of the present description provide systems and methods for restarting a file scan based on one or more checkpoints created using a depth-first concurrent scan method. The systems and methods according to embodiments of the present description provide for restarting the file scan upon crash or pre-determined termination of the file system scan with no loss of work. Non-limited example of a file system includes network-attached storage (NAS).

FIG. 1 illustrates an example system 100 for scanning a file system. The system 100 includes a memory 102 storing one or more processor-executable routines and a processor 104 communicatively coupled to the memory 102. As shown in FIG. 1, the system 100 is communicatively coupled to a file system 106. The processor 104 is configured to execute the one or more processor-executable routines to execute a file system scan using a depth-first concurrent scan method; create one or more checkpoints during the file system scan based on one or more predefined time intervals; and restart a scan from a latest checkpoint of the plurality of checkpoints.

In some embodiments, the processor 104 is configured to execute the one or more processor-executable routines to execute a file system scan using a concurrent depth-first scan method. A concurrent depth-first concurrent scan method provides for an optimal checkpoint method as described in detail later.

The depth-first concurrent scan method includes dividing a scan workload into a plurality of concurrent scan tracks and assigning each scan track of the plurality of concurrent scan tracks to a corresponding scan worker. A scan track of the plurality of scan tracks is assigned to a scan worker such that a scan worker works on at most one scan track at a time. The depth-first concurrent scan method further includes splitting a scan track to assign a portion of the scan track to an idle worker from an idle worker collection.

The term "scan track" as used herein refers to a pair of filesystem paths and a Boolean value. For example:
{Head, Cursor, Done}
In the example above, head and cursor are absolute filesystem paths where cursor is a subpath/descendant of head in the filesystem hierarchy. The Boolean value done marks whether cursor has or hasn't been scanned. Therefore, a scan track represents a slice of the filesystem hierarchy that includes head and the entire sub-tree rooted at head. The term "root track" as used herein refers to a scan track where the head and the cursor are the same.

The following examples illustrate different scan tracks at different stages of a scan.

{"/", "/", false} represents the entire filesystem that hasn't been scanned. A new scan always begins with this scan track being assigned to one scan worker.

{"/", "/", true} represents the entire filesystem that has been completely scanned.

{"/usr", "/usr", false} represents a slice of the filesystem rooted at "/usr" that hasn't been scanned. This is an example of a root track according to embodiments of the present description.

{"/usr", "/usr", true} represents a slice of the filesystem rooted at "/usr" that has been completely scanned.

{"/usr", "/usr/local", false} represents a slice of the filesystem rooted at "/usr" that is partially scanned with "/usr/local" yet to be scanned.

{"/usr", "/usr/local", true} represents a slice of the filesystem rooted at "/usr" that is partially scanned with "/usr/local" already scanned.

As noted earlier, a scan track is assigned to a scan worker, to be exclusively worked upon, in a scheme where multiple scan workers collaborate to work concurrently and scan entire filesystems. The term "worker" is an executable entity like a thread or a co-routine that can scan a slice of the filesystem or the entire filesystem as per a given scan algorithm. The term "scan worker" as used herein refers to a worker that has a scan track associated with it.

The term "idle worker" as used herein refers to a worker that is idle and without an associated scan track. Idle workers are discoverable by scan workers from a shared idle worker collection where idle workers are parked. Scan workers can assign work to an idle worker by first atomically extracting one from the idle worker collection and assigning a sub-portion of the track to the extracted idle worker. Scan workers, upon completion of their scan track, become idle workers and park themselves in the shared idle worker collection.

In some embodiments, the depth-first concurrent scan method includes creating a scan worker and assigning a root track in the directory to the scan worker. The depth-first concurrent scan method further includes sorting contents of the directory in ascending order. The depth-first concurrent scan method furthermore includes checking if an idle worker is available from the idle worker collection and assigning a portion of the root track to the idle worker if available.

The manner of implementation of the depth-first scan method is further described herein. At bootstrap, one scan worker is created with a root track {"/", "/", false} while the rest of the workers are added to the idle worker collection. Scan workers scan directories by listing and sorting the directory contents in ascending order. For each "/path/to/entry" in the above sorted list of directory contents, if an idle worker exists, the scan worker splits the scan track to create the root track {"/path/to/entry", "/path/to/entry", false} and assign it to an idle worker. The idle worker now becomes a scan worker with its own scan track to scan. If an idle worker doesn't exist and the "/path/to/entry" is a directory, the scan worker descends the scan track and scans the "/path/to/entry" directory as described. Moreover, if an idle worker doesn't exist and the "/path/to/entry" is not a directory, the scan worker scans the "/path/to/entry" file/symlink/other.

When the list of directory contents is exhausted, the scan worker ascends the scan track and scans the next entry in the parent directory. Upon completion of the scan of the scan tracks allocated to them, scan workers retire the scan track to become idle workers. The scan algorithm terminates when all the scan workers are retired.

Figure 2A:
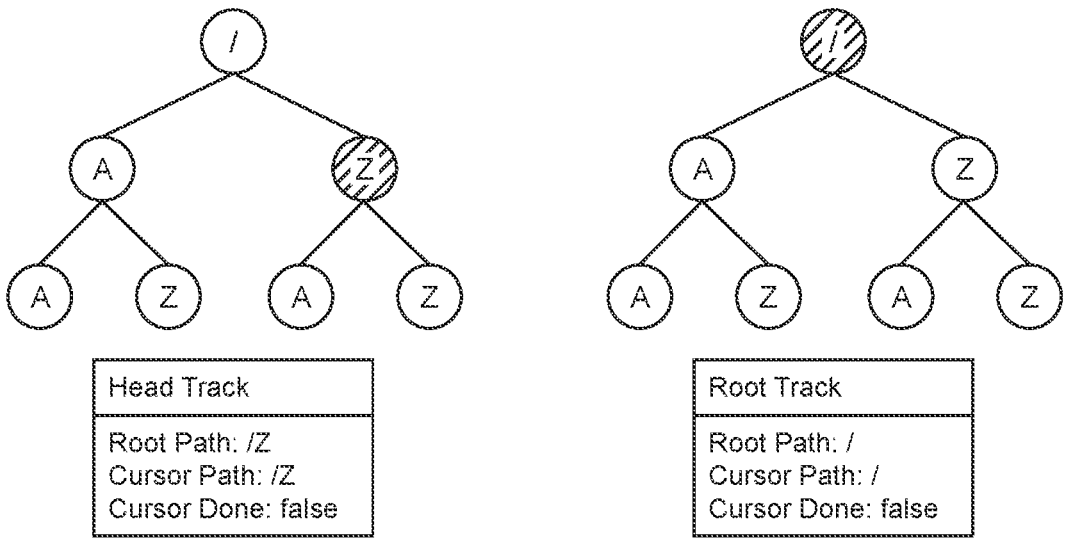
FIG. 2A illustrates an example scenario for a depth-first concurrent scan method, according to some aspects of the present description.

An example depth-first scan method is further described below with reference to FIGS. 2A-2G. FIG. 2A illustrates an example of a head track and a root track and corresponding state of a file system. A head track captures the initial state of a scan track that it is handed over to a scan worker for processing. As noted earlier, in a head track, the root path matches the cursor path with cursor done marked false. The root track is a special case of a head track that encapsulates the entire file system hierarchy.

Figure 2B:
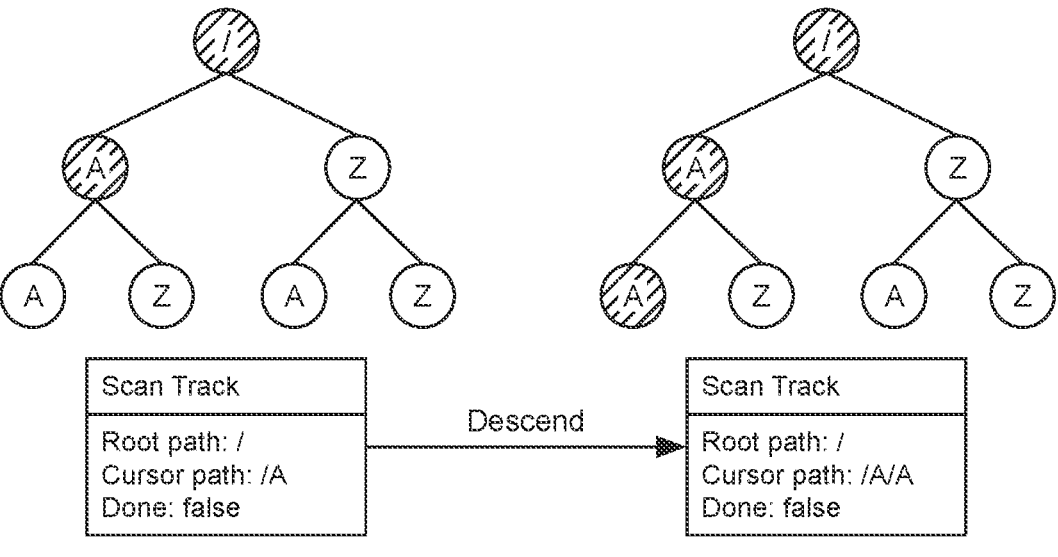
FIG. 2B illustrates an example scenario for a depth-first concurrent scan method, according to some aspects of the present description.

As shown in FIG. 2B, when the cursor path entry is a directory with cursor done marked false, the scan worker descends into that directory to process its children. On descent, it first sorts the children by name before proceeding to process them in order. The scan track captures this transition by replacing cursor path with the path of the first child.

Figure 2C:
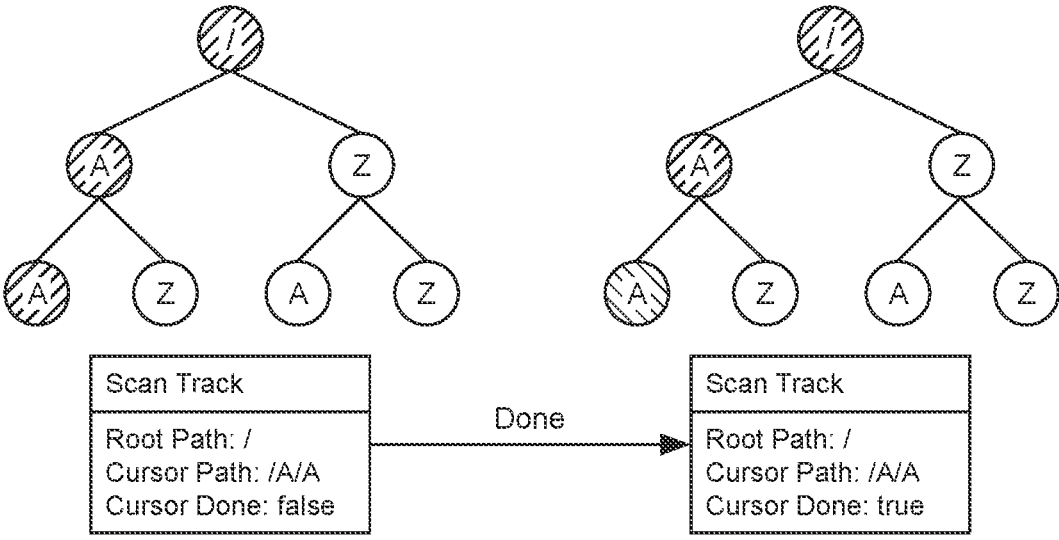
FIG. 2C illustrates an example scenario for a depth-first concurrent scan method, according to some aspects of the present description.

Further, as shown in FIG. 2C, when cursor done is marked false, the scan worker processes the entry at cursor path and marks cursor done as true upon completion. The processing of a directory is deemed complete when all its children are either processed or delegated to other scan workers. The cursor done field indicates whether the processing of cursor path is pending or done.

Figure 2D:
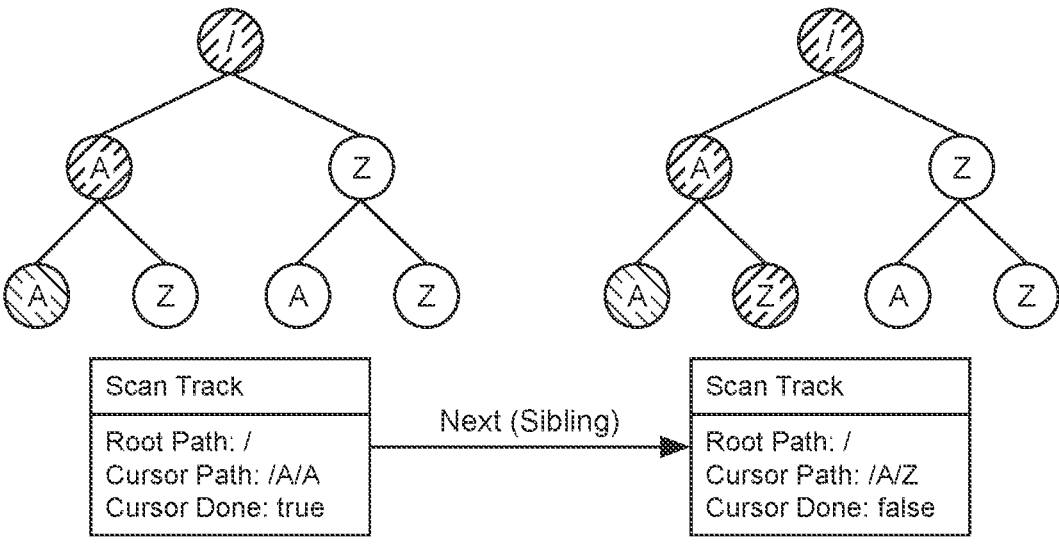
FIG. 2D illustrates an example scenario for a depth-first concurrent scan method, according to some aspects of the present description.

When cursor done is marked true and the entry at cursor path has unprocessed siblings, the scan worker proceeds to process the next sibling, as shown in FIG. 2D. The scan track captures this transition by replacing the cursor path with that of the next sibling and marking cursor done as false indicating that the updated cursor path is yet to be processed.

Figure 2E:
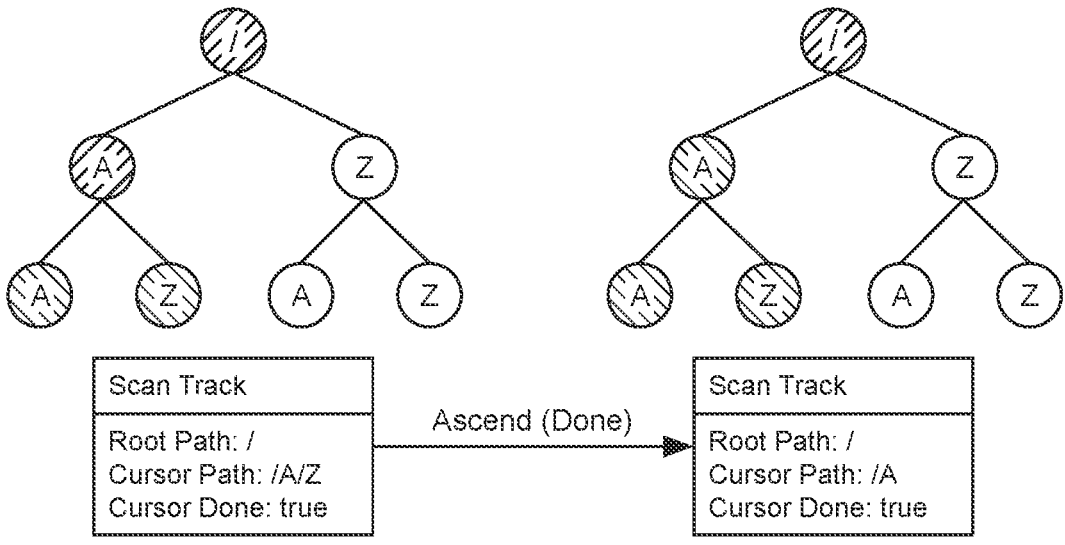
FIG. 2E illustrates an example scenario for a depth-first concurrent scan method, according to some aspects of the present description.

When cursor done is marked true and the entry at cursor path has no more unprocessed siblings, the processing of the parent directory of the cursor path entry is done, as shown in FIG. 2E. The scan track captures this transition by replacing the cursor path with its parent directory path with cursor done marked true.

Figure 2F:
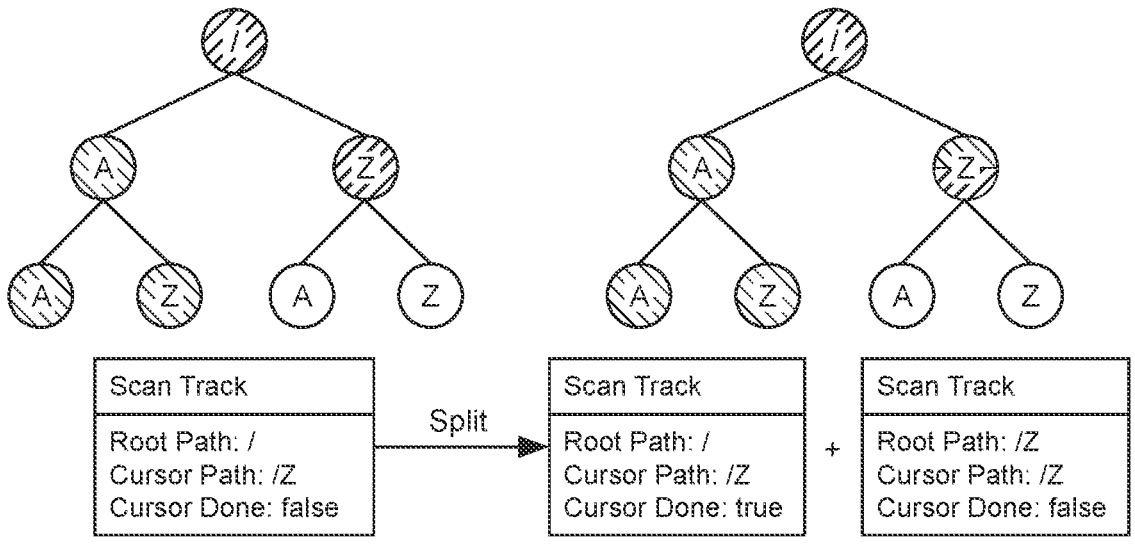
FIGS. 2F and 2G illustrate example scenarios for depth-first concurrent scan methods, according to some aspects of the present description.

Further, as shown in FIG. 2F, when cursor done is marked false indicating that the entry at cursor path needs to be processed, the scan worker can split the scan track and delegate the processing of the cursor path to an idle worker. This transition is captured with cursor done marked true in the current scan track and a new head track rooted at the current cursor path.

Figure 2G:
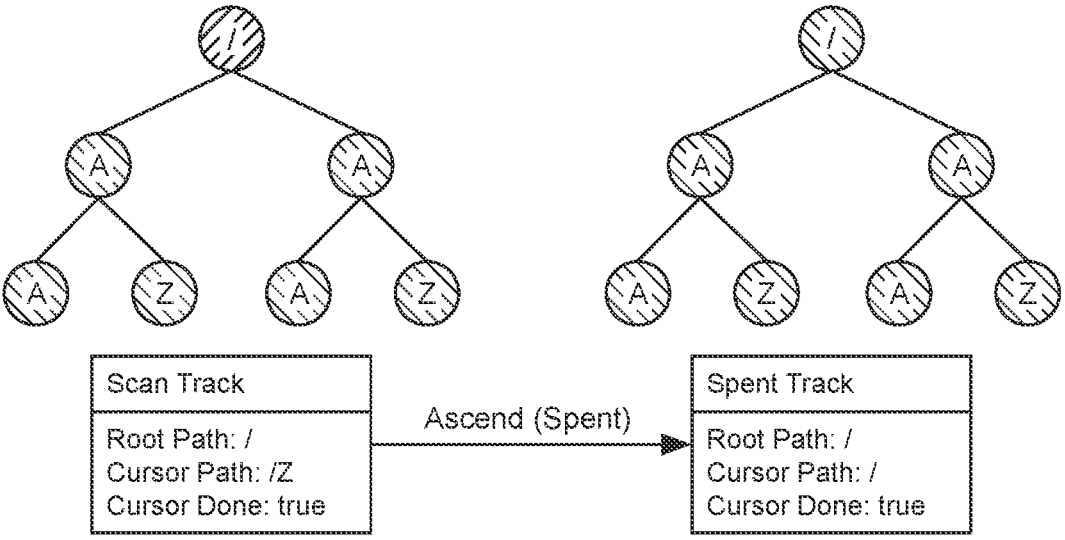

Furthermore, as shown in FIG. 2G, when cursor done is marked true and the entry at cursor path has no more unprocessed siblings, the processing of the parent directory of the cursor path entry is done. The scan track captures this transition by replacing the cursor path with its parent directory path with cursor done marked true. When the updated cursor path matches the root path, the processing of the scan track is deemed complete/spent. Thereby completing the depth-first scan method.

As noted earlier, the processor is further configured to execute the one or more processor-executable routines to create one or more checkpoints during the file system scan based on one or more predefined time intervals. As noted earlier, the checkpoint method allows for restarting the file scan upon crash or pre-determined termination of the file system scan with no loss of work. In some embodiments, the termination of the file scan may be pre-determined, and, in such instances, the checkpoint may be created at the time of the pre-determined termination of the file scan. In some other embodiments, the termination of the file scan may happen because of a system crash and, in such instances, the one or more checkpoints may be created at pre-defined time intervals.

To create the one or more checkpoints, the processor is further configured to execute the one or more processor-executable routines to generate an array including a plurality of worker identifiers and corresponding scan track identifiers. The processor is furthermore configured to execute the one or more processor-executable routines to maintain and mutate the scan tracks allocated to one or more scan workers in the array of worker identifiers and scan track identifiers. The processor is configured to execute the one or more processor-executable routines to create the one or more checkpoints based on a snapshot of the array at the one or more predefined time intervals.

The manner of implementation of creation of the one or more checkpoints is further described herein. The scan tracks are tracked as an array of scan track pointers whose size is equal to the fixed number of workers. Each worker has a unique identifier which is a number between 0 and N−1 where N is the number of workers. Scan workers maintain and mutate the scan track allocated to them in the array of scan track pointers indexed by their identifier. Idle workers have null as scan track in the array of scan track pointers indexed by their identifier. The array of scan tracks serves as the checkpoint from which the scan can be restarted. The size of the checkpoint is bounded above by (N*64) KB where N is the number of ScanTracks with two paths each and a maximum path length of 32 KB is assumed. Scan workers do not interrupt each other as they do not have any synchronization requirements between themselves. Moreover, given the small size of the checkpoint, creating a checkpoint doesn't interrupt the processing of the scan workers for more than a few microseconds.

The processor is configured to execute the one or more processor-executable routines to restart a scan from a latest checkpoint of the plurality of checkpoints, wherein the latest checkpoint comprises a list of scan tracks that capture a state of each scan track worker of a plurality of scan track workers.

In some embodiments, the processor is configured to execute the one or more processor-executable routines to restart a scan from a latest checkpoint of the plurality of checkpoints by assigning a scan worker to a corresponding scan track based on the array of worker identifiers and scan track identifiers captured in the snapshot; assigning a scan worker to an idle worker collection if a scan track corresponding to a worker identifier is not present; and restarting a scan of a scan track from a track cursor if a scan track corresponding to a worker identifier is present.

The manner of implementation of restarting a scan from the latest checkpoint is described herein below. Given the scan algorithm sorts the directory contents at each level, the scan track captures the complete list of scanned paths which happens to be the scan track shadow. The same fixed number of workers are started with scan tracks assigned to them by matching their identifier with the array index. If the scan track that corresponds to a worker identifier is not present, the worker becomes an idle worker and parks itself in the idle worker collection. And, when a scan track that corresponds to a worker identifier is present, the worker resumes scanning the scan track starting from the track cursor. The restart of the scan of a scan track starts with the root track. The restart includes iteratively descending the path hierarchy and, at each level, scanning only those entries that are outside the scan track shadow. On restart, if any entry that is part of the scan track checkpoint is found to be deleted, the scan resumes at the next available entry in the path hierarchy found by ascending or next sibling transitions.

The term "scan track shadow" of a scan track refers to the set of all filesystem paths that lie to the left of each medial path of the scan track. The term "medial path", of a scan track refers to a set of all filesystem paths below the track head and extending all the way to the track cursor. For example, the medial paths of {"/", "/B/O/N/E", false} is the set of paths ["/B", "/B/O", "/B/O/N", "/B/O/N/E"]. Further, for a filesystem which contains directories named after the English alphabet at each level; the scan track shadow of {"/", "/B/O/N/E", false} is the set of paths ["/A/ . . . ", "/B/ [A-N]/ . . . ", "/B/O/[A-M]/ . . . ", "/B/O/N/[A-D]/ . . . "].

Figure 3A:
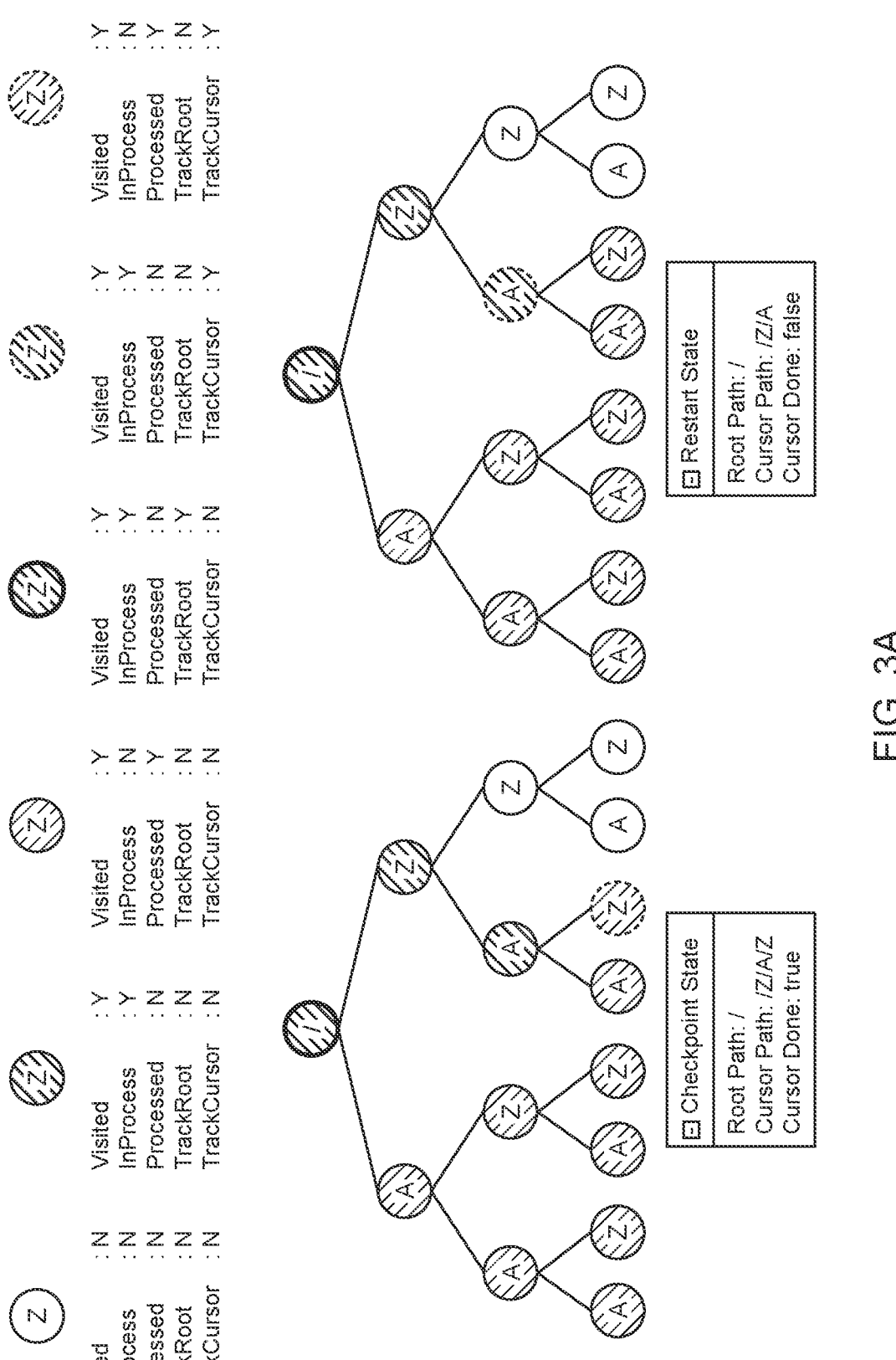
FIG. 3A illustrates an example scenario for a restart method, according to some aspects of the present description.

An example restart method is further described below with reference to FIGS. 3A-3I. As shown in FIG. 3A, on restart, if cursor done is marked true signifying that the cursor path processing was completed and if the cursor path has no siblings that are pending processing, the scan track ascends the path hierarchy reflected by the cursor path being replaced by the parent directory of the current cursor path.

Figure 3B:
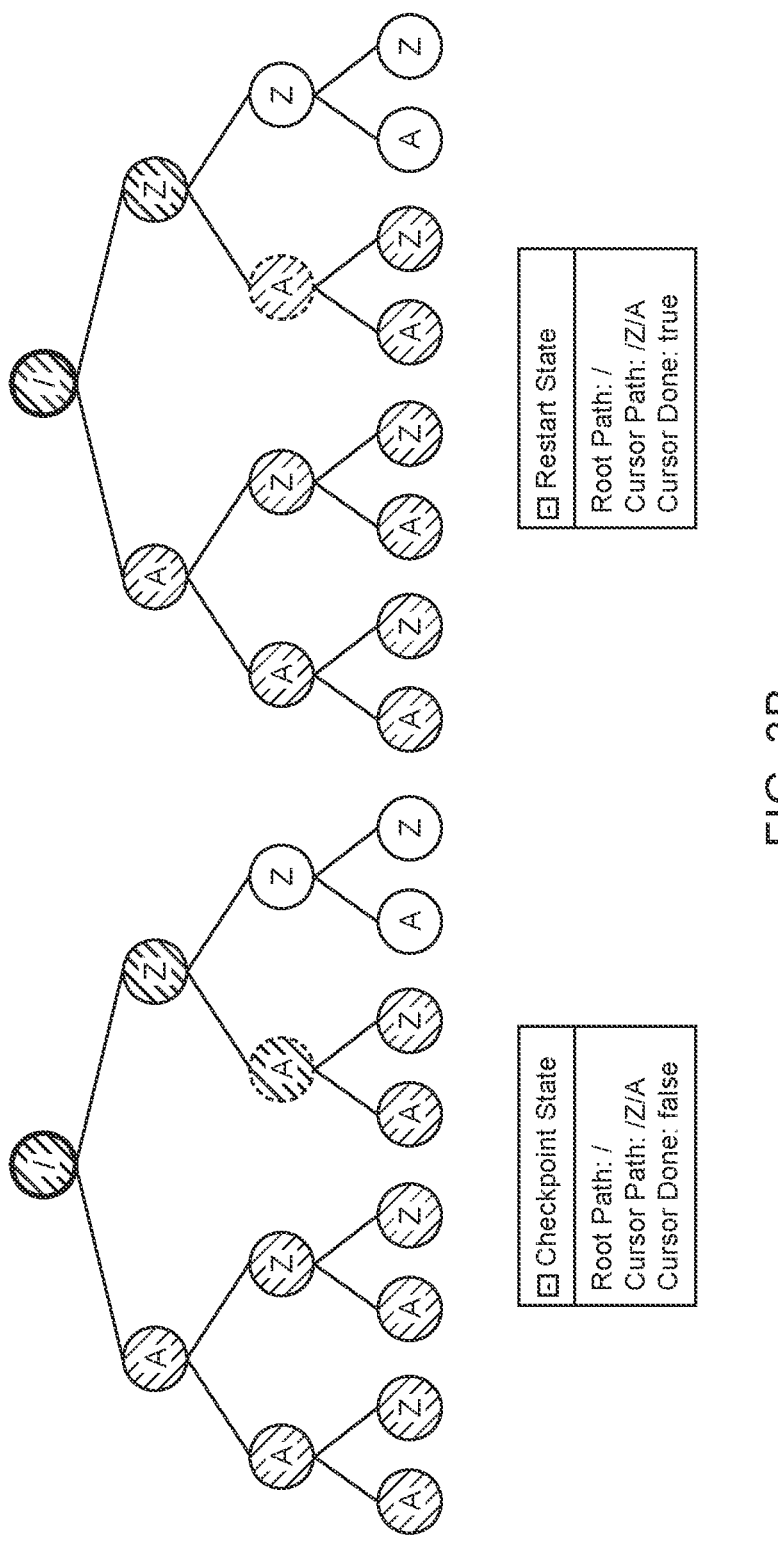
FIG. 3B illustrates an example scenario for a restart method, according to some aspects of the present description.

Further, as shown in FIG. 3B, on restart, if the cursor path processing is found to be incomplete, the scan would resume the processing of the cursor path entry. The cursor done would be marked true on completion of the cursor path entry processing.

Figure 3C:
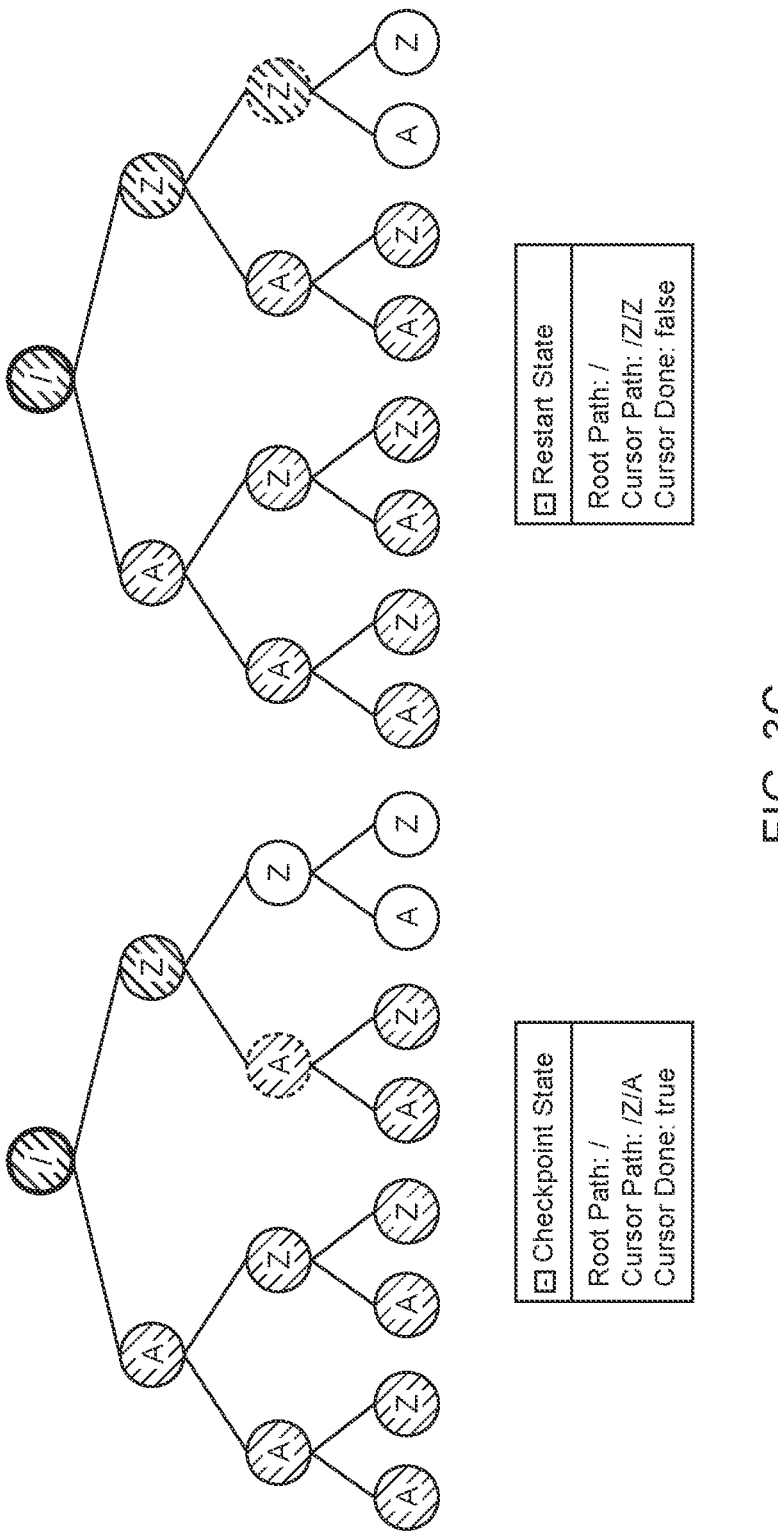
FIG. 3C illustrates an example scenario for a restart method, according to some aspects of the present description.
Figure 3D:
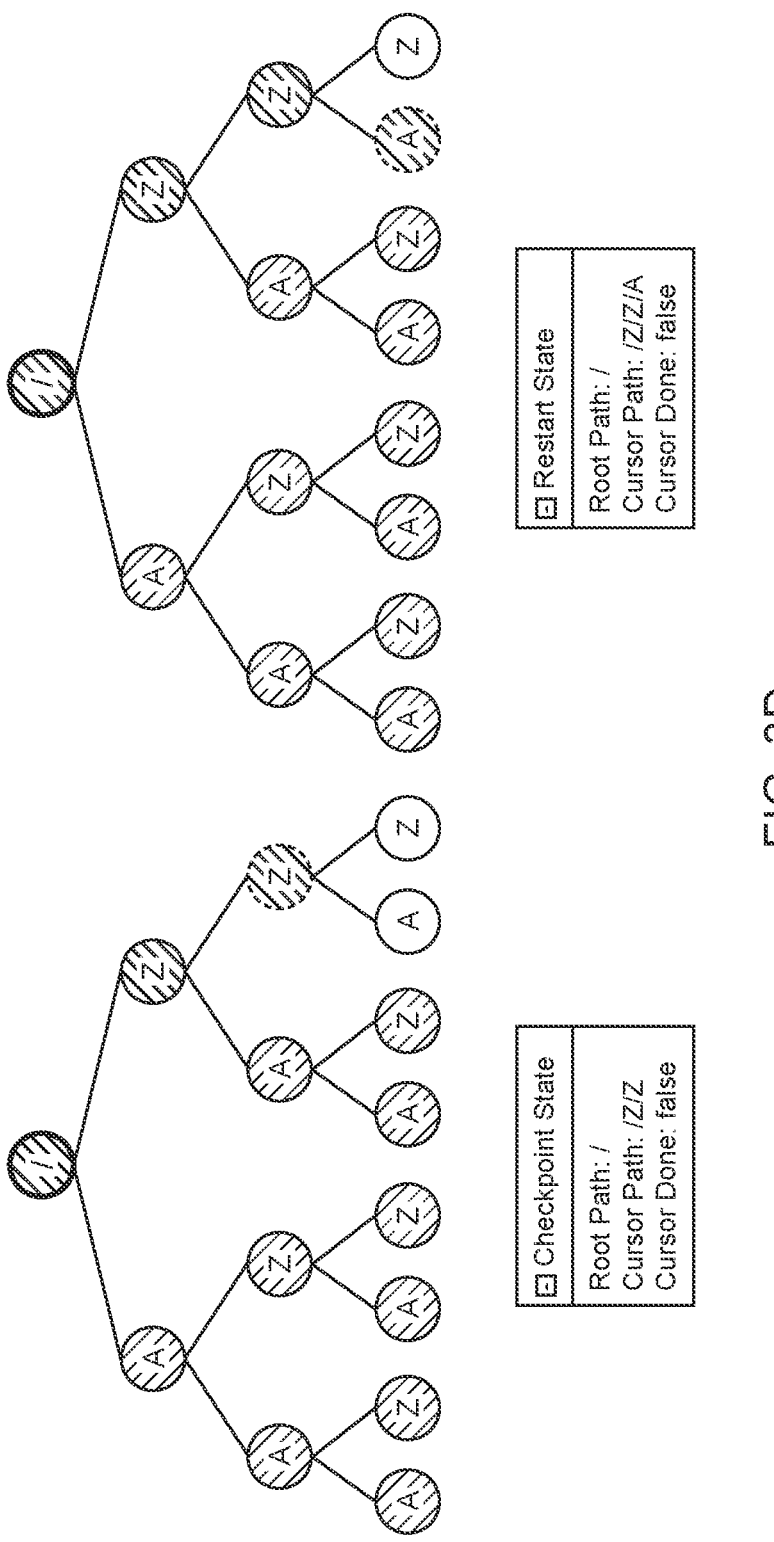
FIG. 3D illustrates an example scenario for a restart method, according to some aspects of the present description.

As shown in FIG. 3C, on restart, if cursor done is marked true signifying that the cursor path processing was completed and if the cursor path has siblings that are pending processing, the scan track moves on to process the next sibling reflected by the cursor path being replaced by the next sibling of the current cursor path and the cursor done marked false. On restart, if the cursor path processing is found to be incomplete, the scan would resume the processing of the cursor path entry, as shown in FIG. 3D. And if the cursor path entry is a directory, the scan track descends the path hierarchy reflected by the cursor path being replaced by the first descendant of the current cursor path.

Figure 3E:
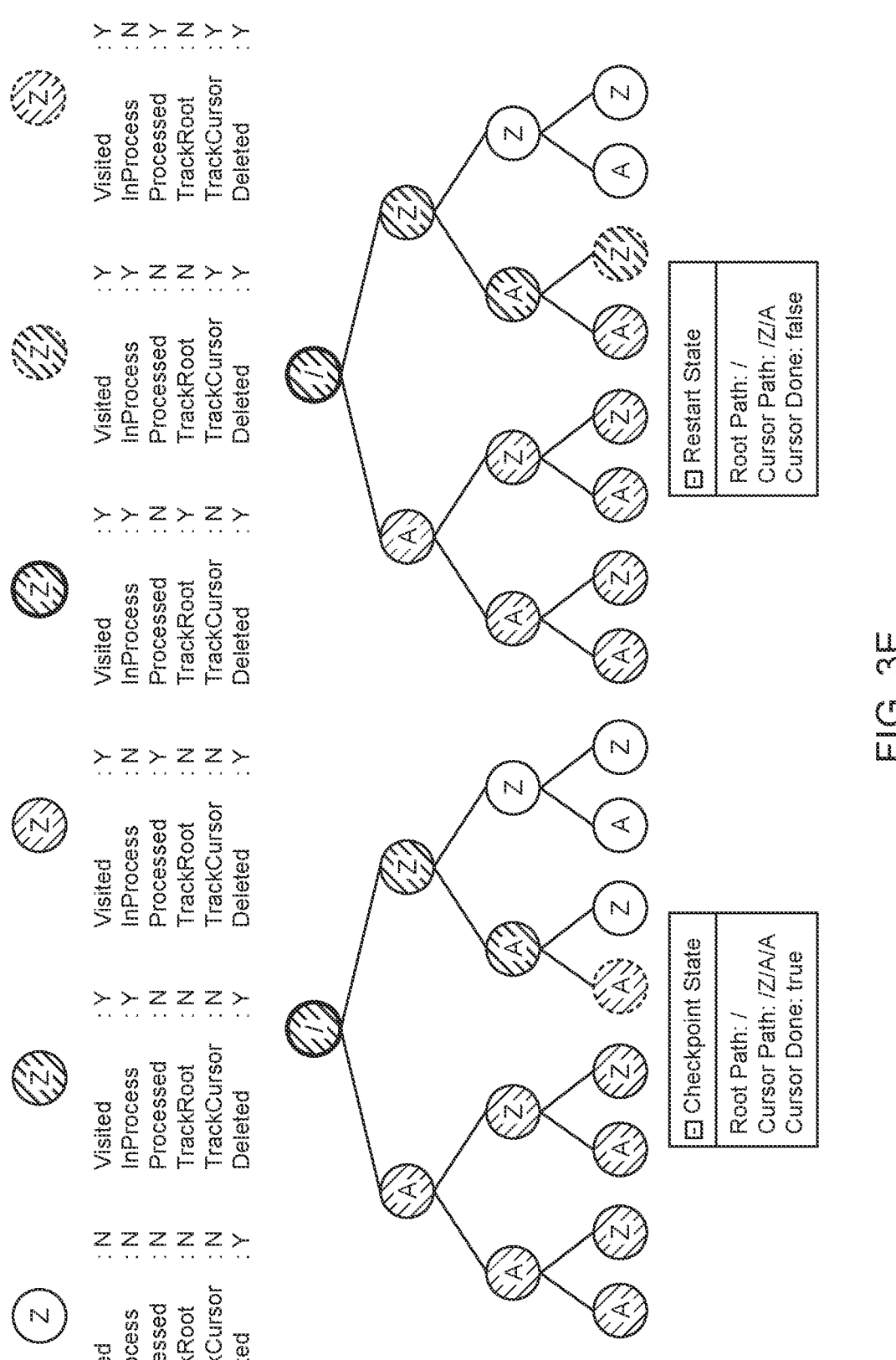
FIG. 3E illustrates an example scenario for a restart method, according to some aspects of the present description.
Figure 3F:
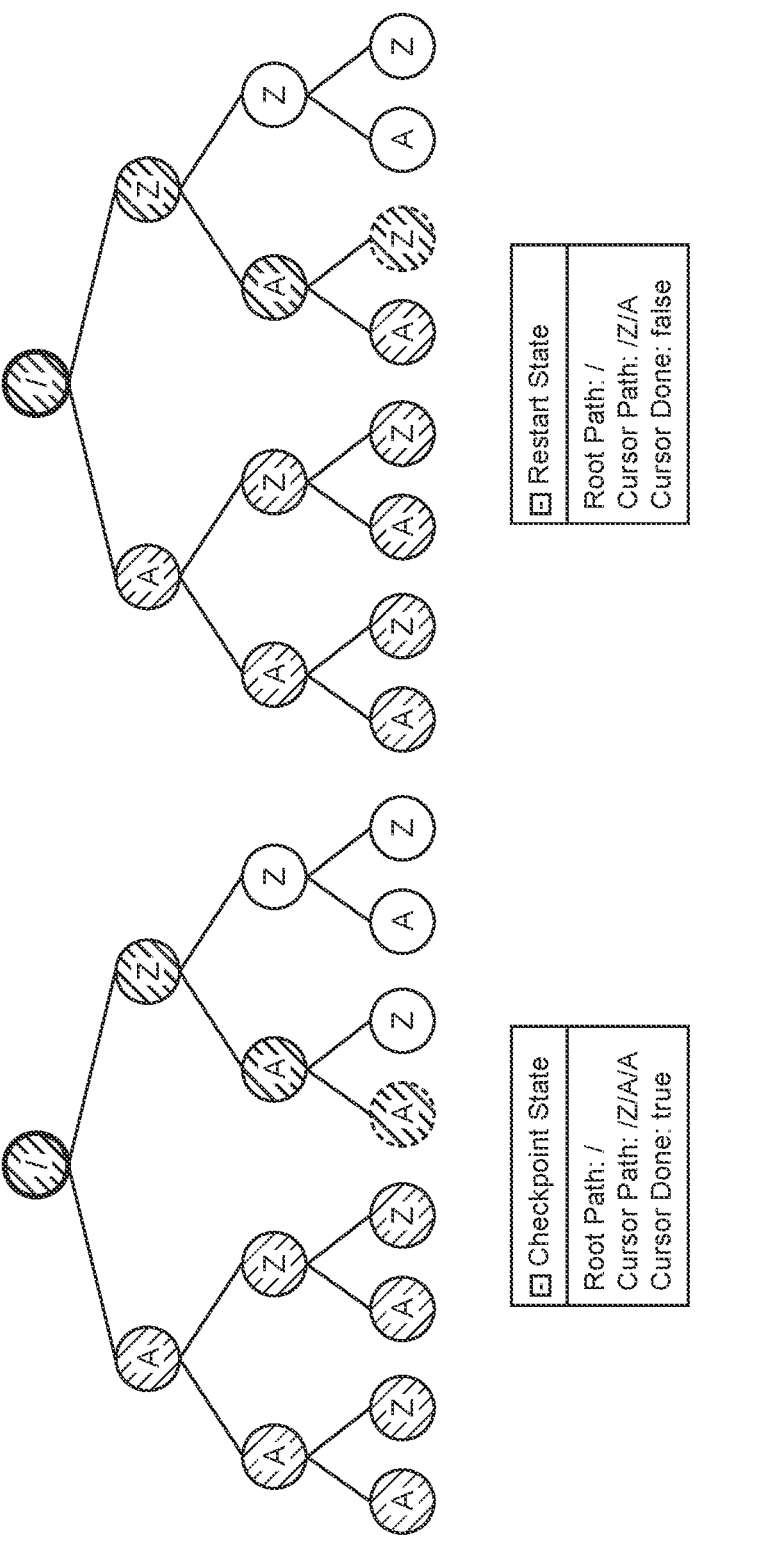
FIG. 3F illustrates an example scenario for a restart method, according to some aspects of the present description.

Furthermore, as shown in FIG. 3E, on restart, if the cursor path entry is found to be deleted, the scan resumes at the next sibling of the deleted entry. And if the cursor path entry processing was completed, the deleted entry would be part of the list of scanned entries. As shown in FIG. 3F, on restart, if the cursor path entry is found to be deleted, the scan resumes at the next sibling of the deleted entry. And if the cursor path entry processing was in progress, the deleted entry would not be part of the list of scanned entries.

Figure 3G:
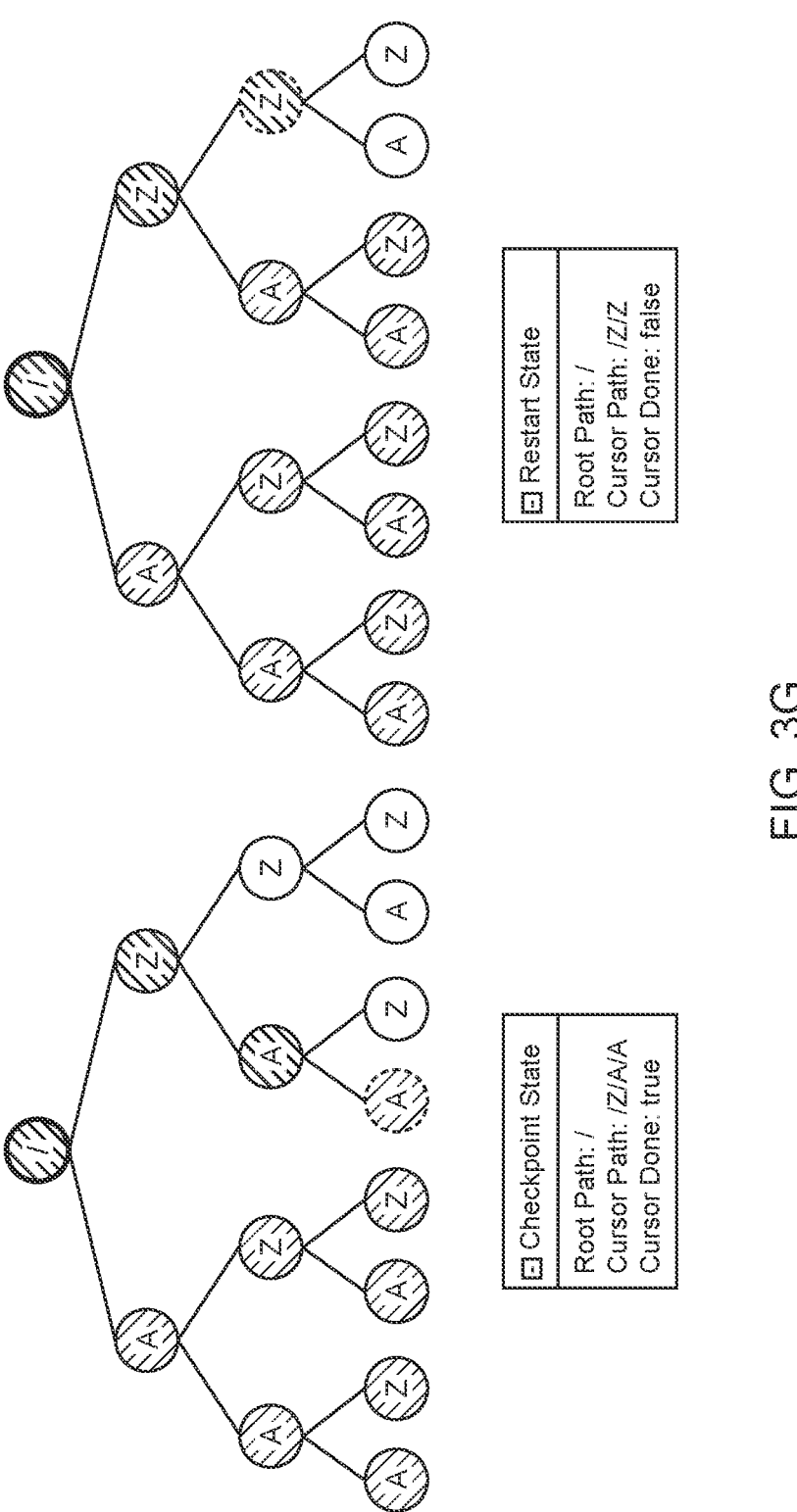
FIG. 3G illustrates an example scenario for a restart method, according to some aspects of the present description.

Moreover, as shown in FIG. 3G, on restart, if a medial directory of a track's checkpoint is found to be deleted along with all its descendants, the scan resumes at the next sibling of the deleted directory. The scan of the deleted medial directories is aborted on restart which can lead to partially scanned directories. And if the cursor path entry processing was completed, it would be part of the list of scanned entries.

Figure 3H:
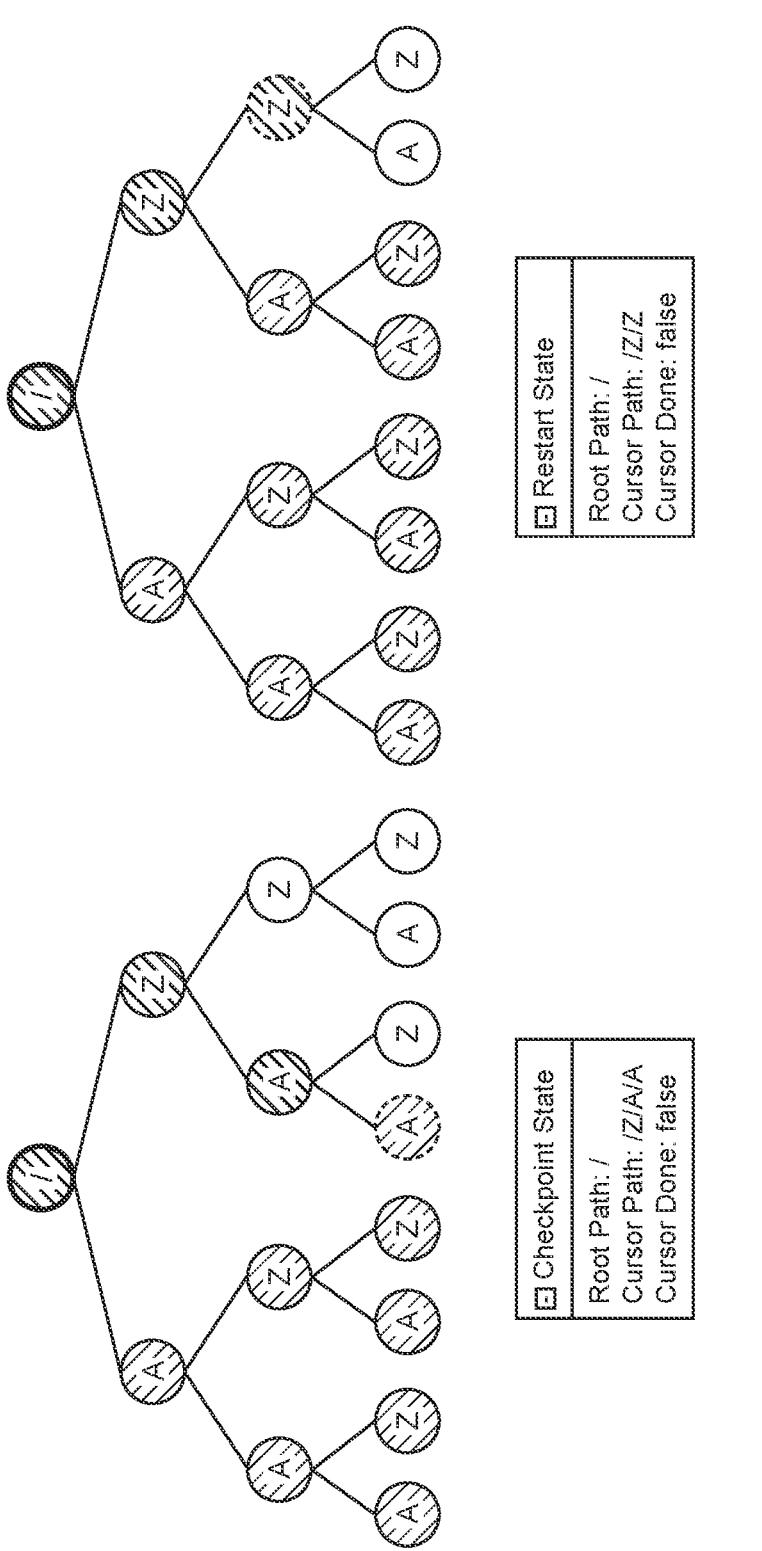
FIG. 3H illustrates an example scenario for a restart method, according to some aspects of the present description.
Figure 31:
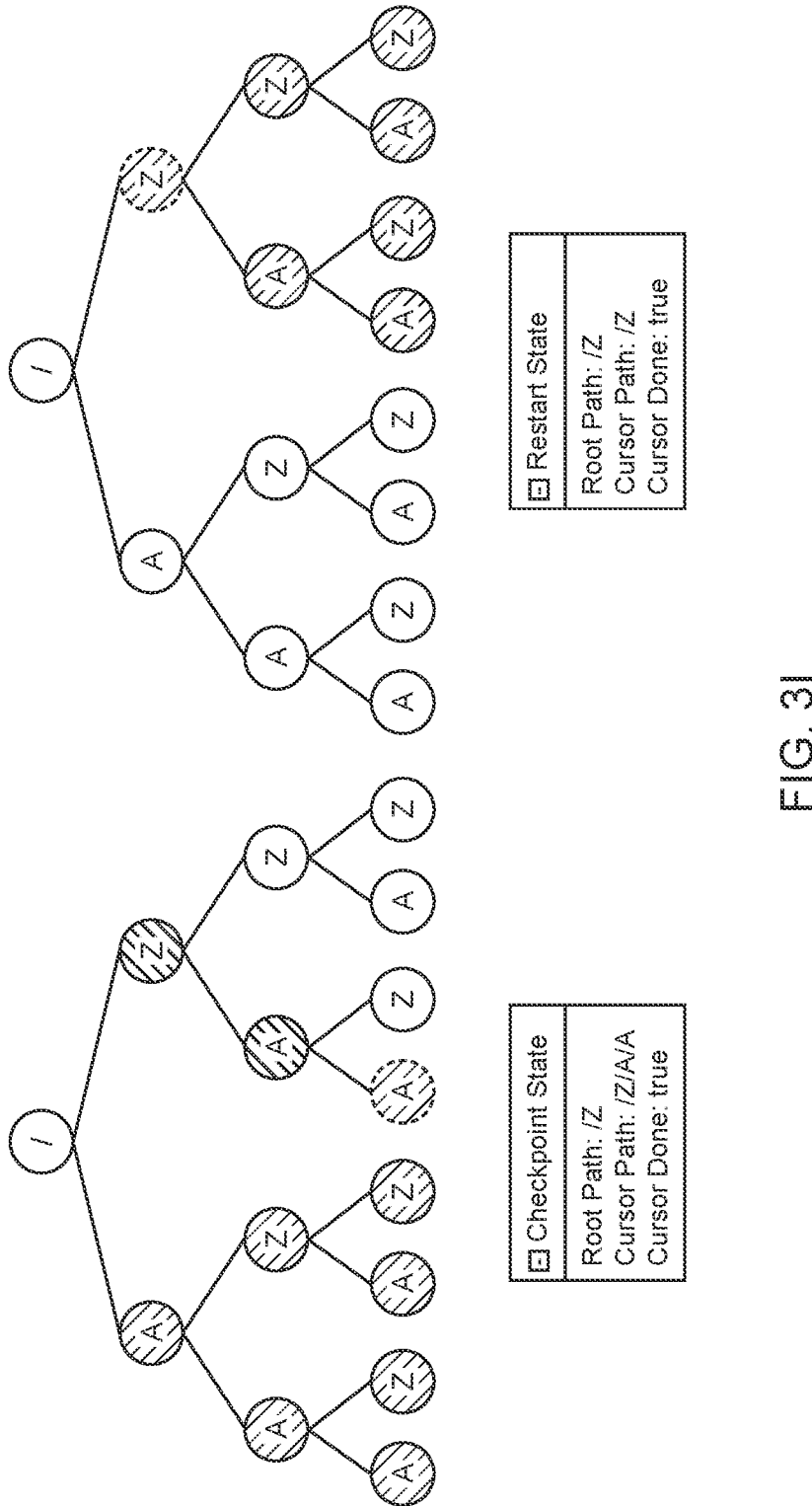

As shown in FIG. 3H, on restart, if a medial directory of a track's checkpoint is found to be deleted along with all its descendants, the scan resumes at the next sibling of the deleted directory. The scan of the deleted medial directories is aborted on restart which can lead to partially scanned directories. And if the cursor path entry processing was in progress, it would not be part of the list of scanned entries.

Further, as shown in FIG. 3I, on restart, if a medial directory of a track's checkpoint is found to be deleted along with all its descendants, the scan resumes at the next sibling of the deleted directory. The scan of the deleted medial directories is aborted in restart which can lead to partially scanned directories. And if the cursor path entry processing was in progress, it would not be part of the list of scanned entries.

Figure 4:
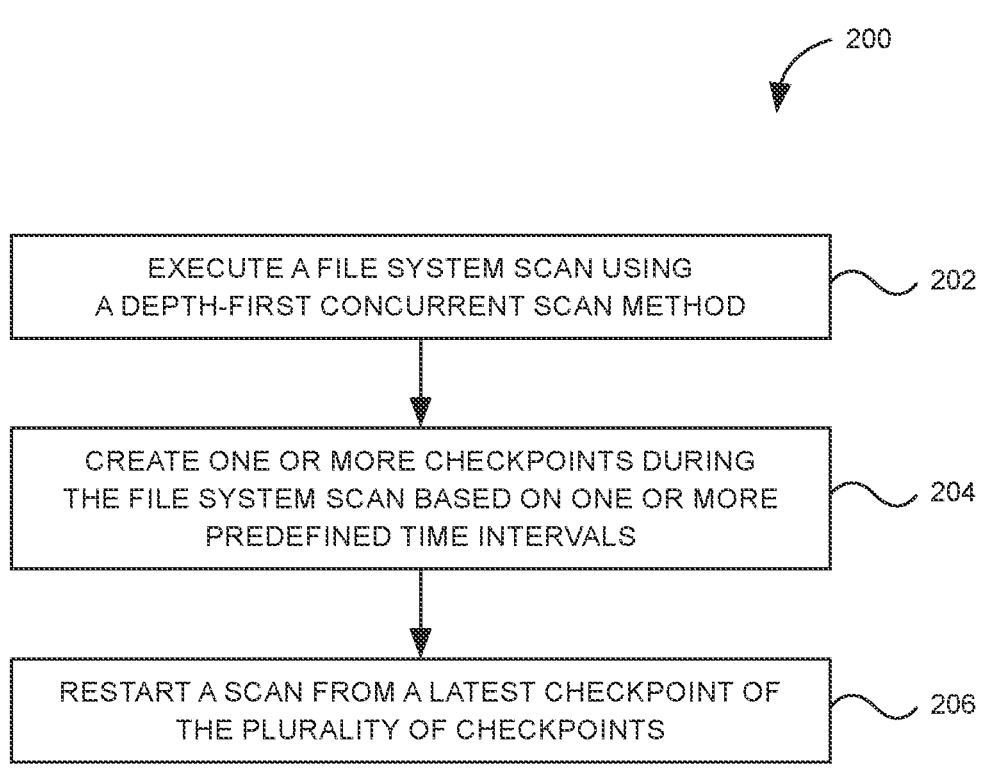
FIG. 4 is a flow chart illustrating an example file scan method, according to some aspects of the present description.

FIG. 4 is a flowchart illustrating a method 200 for scanning a file system. The method 200 may be implemented using the system 100 of FIG. 1 according to some aspects of the present description. The method 200 according to embodiments of the present description provides for restarting the file scan upon crash or pre-determined termination of the file system scan with no loss of work. Non-limited example of a file system includes network-attached storage (NAS). Each step of the method 200 is described in detail below.

The method 200 includes, at block 202 executing a file system scan using a depth-first concurrent scan method. The depth-first concurrent scan method includes dividing a scan workload into a plurality of concurrent scan tracks and assigning each scan track of the plurality of concurrent scan tracks to a corresponding scan worker. A scan track of the plurality of scan tracks is assigned to a scan worker such that a scan worker works on at most one scan track at a time. The depth-first concurrent scan method further includes splitting a scan track to assign a portion of the scan track to an idle worker from an idle worker collection.

In some embodiments, the depth-first concurrent scan method includes creating a scan worker and assigning a root track in the directory to the scan worker. The depth-first concurrent scan method further includes sorting contents of the directory in ascending order. The depth-first concurrent scan method furthermore includes checking if an idle worker is available from the idle worker collection and assigning a portion of the root track to the idle worker if available. The manner of implementation of the depth-first scan method is described herein earlier.

The method 200 further includes, at block 204, creating one or more checkpoints during the file system scan based on one or more predefined time intervals. As noted earlier, the checkpoint method allows for restarting the file scan upon crash or pre-determined termination of the file system scan with no loss of work. In some embodiments, the termination of the file scan may be pre-determined, and, in such instances, the checkpoint may be created at the time of the pre-determined termination of the file scan. In some other embodiments, the termination of the file scan may happen because of a system crash and, in such instances, the one or more checkpoints may be created at pre-defined time intervals.

The method 200 further includes, at block 204, generating an array including a plurality of worker identifiers and corresponding scan track identifiers. The method 200 further includes, at block 204, maintaining and mutating the scan tracks allocated to one or more scan workers in the array of worker identifiers and scan track identifiers. The method 200, moreover includes, at block 204, creating the one or more checkpoints based on a snapshot of the array at the one or more predefined time intervals.

At block 206, the method 200 includes restarting a scan from a latest checkpoint of the plurality of checkpoints. The method 200 includes, at block 206, restarting a scan from a latest checkpoint of the plurality of checkpoints, wherein the latest checkpoint includes a list of scan tracks that capture a state of each scan track worker of a plurality of scan track workers.

The method 200 includes, at block 206, restarting a scan from a latest checkpoint of the plurality of checkpoints by assigning a scan worker to a corresponding scan track based on the array of worker identifiers and scan track identifiers captured in the snapshot; assigning a scan worker to an idle worker collection if a scan track corresponding to a worker identifier is not present; and restarting a scan of a scan track from a track cursor if a scan track corresponding to a worker identifier is present.

The systems and methods described herein may be partially or fully implemented by a special purpose computer system created by configuring a general-purpose computer to execute one or more functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process, and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with the hardware of the special purpose computer, device drivers that interact with devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Figure 5:
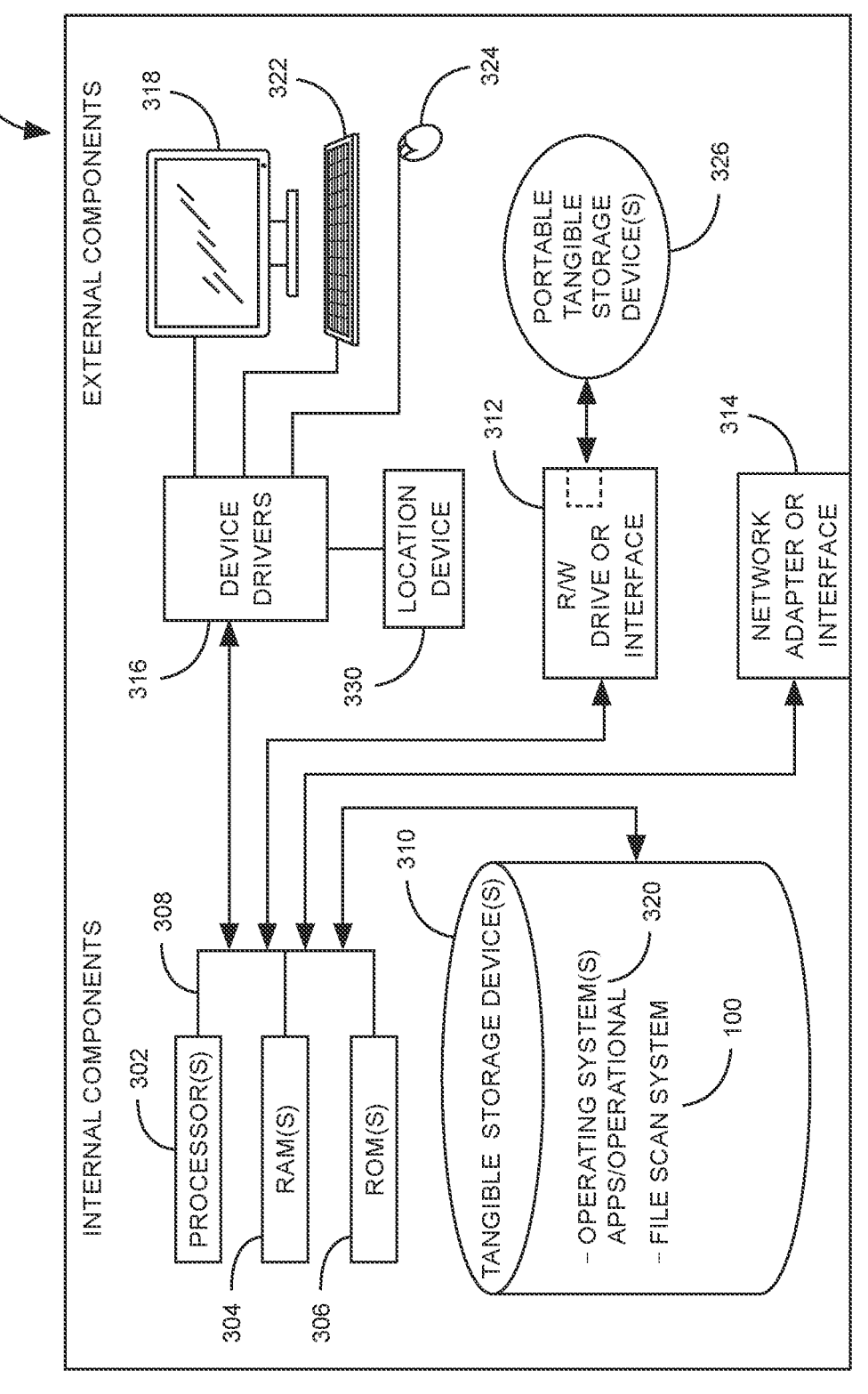
FIG. 5 is a block diagram illustrating an example computer system, according to some aspects of the present description.

One example of a computing system 300 is described below in FIG. 5. The computing system 300 includes one or more processor 302, one or more computer-readable RAMs 304 and one or more computer-readable ROMs 306 on one or more buses 308. Further, the computer system 308 includes a tangible storage device 310 that may be used to execute operating systems 320 and the file scan system 100. Both, the operating system 320 and file scan system 100 are executed by processor 302 via one or more respective RAMs 304 (which typically includes cache memory). The execution of the operating system 320 and/or the file scan system 100 by the processor 302, configures the processor 302 as a special-purpose processor configured to carry out the functionalities of the operating system 320 and/or the file scan system 100, as described above.

Examples of storage devices 310 include semiconductor storage devices such as ROM 506, EPROM, flash memory or any other computer-readable tangible storage device that may store a computer program and digital information.

Computer system 300 also includes a R/W drive or interface 312 to read from and write to one or more portable computer-readable tangible storage devices 326 such as a CD-ROM, DVD, memory stick or semiconductor storage device. Further, network adapters or interfaces 314 such as a TCP/IP adapter cards, wireless Wi-Fi interface cards, or 3G or 4G wireless interface cards or other wired or wireless communication links are also included in the computer system 300.

In one example embodiment, the file scan system 100 may be stored in tangible storage device 310 and may be downloaded from an external computer via a network (for example, the Internet, a local area network or another wide area network) and network adapter or interface 314.

Computer system 300 further includes device drivers 316 to interface with input and output devices. The input and output devices may include a computer display monitor 318, a keyboard 322, a keypad, a touch screen, a computer mouse 324, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

What is claimed is:

1. A system for scanning a file system, the system comprising:
   a memory storing one or more processor-executable routines; and
   a processor communicatively coupled to the memory, the processor configured to execute the one or more processor-executable routines to:
   execute a file system scan using a depth-first concurrent scan method, the depth-first concurrent scan method comprising dividing a scan workload into a plurality of concurrent scan tracks, and assigning each scan track of the plurality of concurrent scan tracks to a corresponding scan worker;
   create one or more checkpoints during the file system scan based on one or more predefined time intervals; and
   restart a scan from a latest checkpoint of the one or more of checkpoints.

2. The system of claim 1, wherein the processor is configured to execute the one or more processor-executable routines to execute the depth-first concurrent scan method comprising splitting a scan track to assign a portion of the scan track to a first idle worker from an idle worker collection.

3. The system of claim 2, wherein the processor is configured to execute the one or more processor-executable routines to execute the depth-first concurrent scan method comprising:
   creating a scan worker and assigning a root track in a directory to the scan worker;
   sorting contents of the directory in ascending order;
   checking if an idle worker is available from the idle worker collection; and
   assigning a portion of the root track to the first idle worker if available.

4. The system of claim 1, wherein the processor is further configured to execute the one or more processor-executable routines to generate an array comprising a plurality of worker identifiers and corresponding scan track identifiers.

5. The system of claim 4, wherein the processor is further configured to execute the one or more processor-executable routines to maintain and mutate scan tracks allocated to one or more scan workers in the array comprising worker identifiers and scan track identifiers.

6. The system of claim 4, wherein the processor is configured to execute the one or more processor-executable routines to create the one or more checkpoints based on a snapshot of the array at the one or more predefined time intervals.

7. The system of claim 1, wherein the processor is configured to execute the one or more processor-executable routines to restart a scan from the latest checkpoint of the one or more checkpoints, wherein the latest checkpoint comprises a list of scan tracks that capture a state of each scan track worker of a plurality of scan track workers.

8. The system of claim 7, wherein the processor is configured to restart the scan from the latest checkpoint of the one or more checkpoints by:

assigning a scan worker to a corresponding scan track based on an array comprising worker identifiers and scan track identifiers captured in a snapshot;

assigning a scan worker to an idle worker collection if a scan track corresponding to a worker identifier is not present; and restarting a scan of a scan track from a track cursor if a scan track corresponding to a worker identifier is present.

9. The system of claim 1, wherein the processor is configured to execute the one or more processor-executable routines to restart a scan from a latest checkpoint of the one or more checkpoints upon crash or pre-determined termination of the file system scan.

10. A method for scanning a file system, the method comprising:

executing a file system scan using a depth-first concurrent scan method, wherein the depth-first concurrent scan method comprises dividing a scan workload into a plurality of concurrent scan tracks, and assigning each scan track of the plurality of concurrent scan tracks to a corresponding scan worker;

creating one or more checkpoints during the file system scan based on one or more predefined time intervals; and restarting a scan from a latest checkpoint of the one or more checkpoints.

11. The method of claim 10, wherein the depth-first concurrent scan method comprises splitting a scan track to assign a portion of the scan track to a first idle worker from an idle worker collection.

12. The method of claim 11, wherein the depth-first concurrent scan method comprises:

creating a scan worker and assigning a root track in a directory to the scan worker;

sorting contents of the directory in ascending order;

checking if an idle worker is available from the idle worker collection; and assigning a portion of the root track to the first idle worker if available.

13. The method of claim 10, wherein the method further comprises generating an array comprising a plurality of worker identifiers and corresponding scan track identifiers.

14. The method of claim 13, wherein the method further comprises maintaining and mutating scan tracks allocated to one or more scan workers in the array comprising worker identifiers and scan track identifiers.

15. The method of claim 10, wherein the method comprises creating the one or more checkpoints based on a snapshot, at the one or more predefined time intervals, of an array comprising worker identifiers and scan track identifiers.

16. The method of claim 10, wherein the method comprises restarting a scan from the latest checkpoint of the one or more checkpoints, wherein the latest checkpoint comprises a list of scan tracks that capture a state of each scan track worker of a plurality of scan track workers.

17. The method of claim 16, wherein the method comprises restarting the scan from the latest checkpoint of the one or more checkpoints by:

assigning a scan worker to a corresponding scan track based on an array comprising worker identifiers and scan track identifiers captured in a snapshot;

assigning a scan worker to an idle worker collection if a scan track corresponding to a worker identifier is not present; and restarting a scan of a scan track from a track cursor if a scan track corresponding to a worker identifier is present.

18. The method of claim 10, wherein the method comprises restarting a scan from a latest checkpoint of the one or more checkpoints upon crash or pre-determined termination of the file system scan.

* * * * *